(12) United States Patent
Wu

(10) Patent No.: US 7,010,595 B2
(45) Date of Patent: Mar. 7, 2006

(54) APPARATUS FOR MULTI-LEVEL LOOPBACK TEST IN A COMMUNITY NETWORK SYSTEM AND METHOD THEREFOR

(75) Inventor: Chien-Soon Wu, Hsinchu (TW)

(73) Assignee: D-Link Corp., Hsinchu (TW)

( * ) Notice: Subject to any disclaimer, the term of this patent is extended or adjusted under 35 U.S.C. 154(b) by 781 days.

(21) Appl. No.: 10/014,601

(22) Filed: Dec. 14, 2001

(65) Prior Publication Data

US 2003/0115368 A1 Jun. 19, 2003

(51) Int. Cl.
| | |
|---|---|
| G06F 15/16 | (2006.01) |
| G06F 15/173 | (2006.01) |
| G06F 11/00 | (2006.01) |
| G06F 13/00 | (2006.01) |
| G01R 31/08 | (2006.01) |
| G01R 31/28 | (2006.01) |

(52) U.S. Cl. .................. 709/224; 709/223; 709/233; 709/239; 370/218; 370/244; 370/249; 370/251; 714/25; 714/716; 714/741; 714/742; 703/20

(58) Field of Classification Search ............ 709/203, 709/223–229, 232, 233, 238, 239, 251; 370/218, 370/232–234, 241–245, 250, 253, 248, 249; 714/4, 25, 47, 715, 716, 738, 741, 742; 703/20, 703/21

See application file for complete search history.

(56) References Cited

U.S. PATENT DOCUMENTS

| | | | | |
|---|---|---|---|---|
| 5,189,663 A | * | 2/1993 | Williams | 370/251 |
| 5,708,654 A | * | 1/1998 | Arndt et al. | 370/242 |
| 5,737,316 A | * | 4/1998 | Lee | 370/248 |
| 5,878,030 A | * | 3/1999 | Norris | 370/241 |
| 6,032,194 A | * | 2/2000 | Gai et al. | 709/239 |
| 6,052,362 A | * | 4/2000 | Somer | 370/246 |
| 6,128,658 A | * | 10/2000 | McLean | 709/224 |
| 6,147,972 A | * | 11/2000 | Onishi et al. | 370/248 |

(Continued)

OTHER PUBLICATIONS

Deng, Shuang and Bugos, Alan R. and Hill, Paul M. "Design and Evaluation of an Ethernet-Based Residential Network," IEEE Journal on Selected Areas in Communications, vol. 14, No. 6, Aug. 1996, Pp. 1138-1150.*

(Continued)

*Primary Examiner*—Rupal Dharia
*Assistant Examiner*—Melvin H. Pollack
(74) *Attorney, Agent, or Firm*—Bacon & Thomas, PLLC

(57) ABSTRACT

The present invention is an apparatus for multi-level loopback test in a community network system and method therefor, in which a loopback test device is installed between an Ethernet switch in a community and a central office so that the loopback test device can be utilized by network management system in central office to perform a three-level loopback test on the community network system to easily obtain the information of whether there is a fault between central office and loopback test device, whether the connection of Ethernet switch is good, and whether loopback test device operates normally.

9 Claims, 6 Drawing Sheets

U.S. PATENT DOCUMENTS

| | | | | |
|---|---|---|---|---|
| 6,151,316 A * | 11/2000 | Crayford et al. | | 370/356 |
| 6,173,325 B1 * | 1/2001 | Kukreja | | 709/224 |
| 6,173,411 B1 * | 1/2001 | Hirst et al. | | 714/4 |
| 6,182,135 B1 * | 1/2001 | Ruane et al. | | 709/224 |
| 6,199,172 B1 * | 3/2001 | Dube et al. | | 714/4 |
| 6,252,874 B1 * | 6/2001 | Lee | | 370/389 |
| 6,260,167 B1 * | 7/2001 | Lo et al. | | 714/744 |
| 6,529,480 B1 * | 3/2003 | Stewart et al. | | 370/241 |
| 6,538,997 B1 * | 3/2003 | Wang et al. | | 370/241 |
| 6,615,090 B1 * | 9/2003 | Blevins et al. | | 700/26 |
| 6,678,845 B1 * | 1/2004 | Farooq | | 714/712 |
| 6,684,031 B1 * | 1/2004 | Kogelnik et al. | | 398/99 |
| 6,771,606 B1 * | 8/2004 | Kuan | | 370/248 |
| 6,775,804 B1 * | 8/2004 | Dawson | | 714/776 |
| 6,795,403 B1 * | 9/2004 | Gundavelli | | 370/256 |
| 6,816,462 B1 * | 11/2004 | Booth et al. | | 370/248 |
| 6,857,027 B1 * | 2/2005 | Lindeborg et al. | | 709/239 |
| 6,862,701 B1 * | 3/2005 | Walker et al. | | 714/715 |
| 2003/0163561 A1 * | 8/2003 | Lee et al. | | 709/224 |
| 2003/0177214 A1 * | 9/2003 | Chen et al. | | 709/223 |
| 2004/0240398 A1 * | 12/2004 | Ho et al. | | 370/256 |

OTHER PUBLICATIONS

Irie, Kazunari et al. "Group Communication System Based on MAC-over-IP," 10th IEEE Wkshop on Local and Metropolitan Area Networks, Nov. 1999, Pp. 71-77.*

Farkouh, Stephen C. "Managing ATM-based Broadband Networks," IEEE Communication Magazine, vol. 31, Issue 5, May 1993, Pp. 82-86.*

Ivancic, William D. and Bobinsky, Eric A. "ATM Quality of Service Parameters at 45 Mbps Using a Satellite Emulator," IEEE Global Telecommunications Conference, vol. 2, Nov. 1997, Pp. 1129-1132.*

Laquai, Bernd and Cai, Yi. "Testing Gigabit Multilane SerDes Interfaces with Passive Jitter Injection Filters," Intl. Test Conference, Nov. 2001, Pp. 297-304.*

* cited by examiner

| MAC address (01-80-C2-00) | | | | | |
|---|---|---|---|---|---|
| | source address (\*\*-\*\*) | | | Tx status (8 bits) | |
| MAC address (00-00) | | source address (\*\*-\*\*-\*\*-\*\*) | | | |
| | | | number (00) | padding bits | |
| | | type (90-00) | | | |
| FCS (32 bits) | | | | | |

FIG. 5

| MAC address (01-80-C2-00) | | | | |
|---|---|---|---|---|
| | source address (\*\*-\*\*) | | padding bits | |
| MAC address (00-00) | | source address (\*\*-\*\*-\*\*-\*\*) | | |
| | | number (00) | padding bits | |
| | | type (90-00) | | |
| FCS (32 bits) | | | | |

FIG. 4

| MAC address (01-80-C2-00) | | | | | |
|---|---|---|---|---|---|
| MAC address (00-00) | source address (-) | | | | |
| | source address (---) | | | | |
| type (90-00) | number (01) | loopback test activation (00) loopback test stop (01) | padding bits | | |
| FCS (32 bits) | | | | | |

FIG. 6

APPARATUS FOR MULTI-LEVEL LOOPBACK TEST IN A COMMUNITY NETWORK SYSTEM AND METHOD THEREFOR

FIELD OF THE INVENTION

The present invention relates to network and more particularly to an apparatus for multi-level loopback test in a community network system and method therefor.

BACKGROUND OF THE INVENTION

In recent years, Internet has been widely employed worldwide. In particular, the World Wide Web (WWW) of Internet can provide voice, graphics, and multimedia services in addition to e-mail transmission and receiving. Hence, people can access a variety of information from WWW. Further, many people take log-on the Internet as a daily work. For accommodating such trend, a variety of high speed network devices have been provided by network equipment manufacturers. Such devices comprise cable modem, asymmetric digital subscriber line (ADSL) modem, etc. Moreover, various associated network peripherals are provided by network equipment manufacturers for enhancing the functionality of network. Such peripherals comprise voice over IP device (VoIP), etc. User can employ VoIP to communicate with a remote user over the Internet so as to greatly reduce long distance or international telecommunication charge.

Conventionally, a UTP (Unshielded Twisted Pair) based network architecture is selected from a variety of existing network architectures and is widely employed in a community network system as shown in FIG. 1. Each Ethernet adapter 30 at user comprises an ADSL (Asynchronous Digital Subscriber Line) communication interface (not shown) and a router control circuit (not shown). Ethernet adapter 30 is electrically coupled to an Ethernet equipment (not shown) in central office (or network system communication provider) 34 through router control circuit, UTP based telephone line 31, Ethernet switch 32 of central office 34 installed in a community, and optical fiber 33. The Ethernet equipment is in turn coupled to the Internet 35 through optical fiber 33. Hence, packets from Ethernet adapters 30 can be transmitted to the Internet 35. Alternatively, packets from the Internet 35 can be received by Ethernet adapters 30. In above network architecture, for example, packets originated from central office 34 are transmitted to each of a certain number of users in community through the high speed optical fiber 33, Ethernet switch 32, and an existing telephone line 31 of each user. As a result, the data transmission of each user is much improved in terms of speed.

In the above mentioned FTTH (Fiber To The Home) or ETTH (Ethernet To The Home) application, there is a long distance between Ethernet switch 32 and central office 34. Hence, network is utilized to perform the same. Further, it is impossible to perform a real tim online maintenance and management on Ethernet switch 32 by central office 34 because a SNMP (Simple Network Management Protocel) being employed by most network management systems only has limited application. When the system fails, a loopback test is typically conducted to detect which component is malfunctioned. During the loopback test, network management system installed in central office 34 is responsible to issue at least one Ping instruction. Ethernet switch 32 then may reply to the Ping instruction as it receives the same. Hence, network management system can determine that Ethernet switch 32 fails if there is no reply of the Ping instruction from ethernet switch 32 within a predetermined period of time. In other words, the only technique employed by network management system is to issue a Ping instruction to Ethernet switch 32 for determining whether there is a malfunction from the presence of reply. As to the special problem such as line disconnection, or software in Ethernet switch 32 not normally running, or any other, there is no information about that. Moreover, after network management system has issued a Ping instruction, a good reply means that both hardware and associated software operate normally. Otherwise, it is impossible of obtaining a good reply as well as correctly determining the nature of the fail. For solving the problem, it is typical to assign employees to the site of Ethernet switch 32 to perform a manual maintenance and management. It is disadvantageous because maintenance and management is poor, cost is high, and communication quality is degraded. Thus, a need for improvement exists.

SUMMARY OF THE INVENTION

It is therefore an object of the present invention to provide an apparatus for multi-level loopback test in a community network system and method therefor in which a loopback test device is installed between an Ethernet switch in a community and a central office so that the loopback test device can be utilized by network management system in central office to perform a three-level loopback test on the community network system. By utilizing this, it is possible to easily obtain the information of whether there is a fault between central office and loopback test device, whether the connection of Ethernet switch is good, and whether loopback test device operates normally. Hence, the invention has the advantages of no need to assign employees to the site of Ethernet switch to perform a manual maintenance and management, lower cost, and to improve communication quality.

The above and other objects, features and advantages of the present invention will become apparent from the following detailed description taken with the accompanying drawings.

BRIEF DESCRIPTION OF THE DRAWINGS

FIG. 4 depicts a format of a special BPDU (Bridge Protocol Data Unit) packet issued by network management system during a first level of loopback test according to the invention;

FIG. 5 depicts a format of a reply packet by loopback test device during a first level of loopback test according to the invention;

FIG. 6 depicts a format of a special BPDU (Bridge Protocol Data Unit) packet issued by network management system during a second level of loopback test according to the invention.

DETAILED DESCRIPTION OF THE PREFERRED EMBODIMENTS

Figure 1:
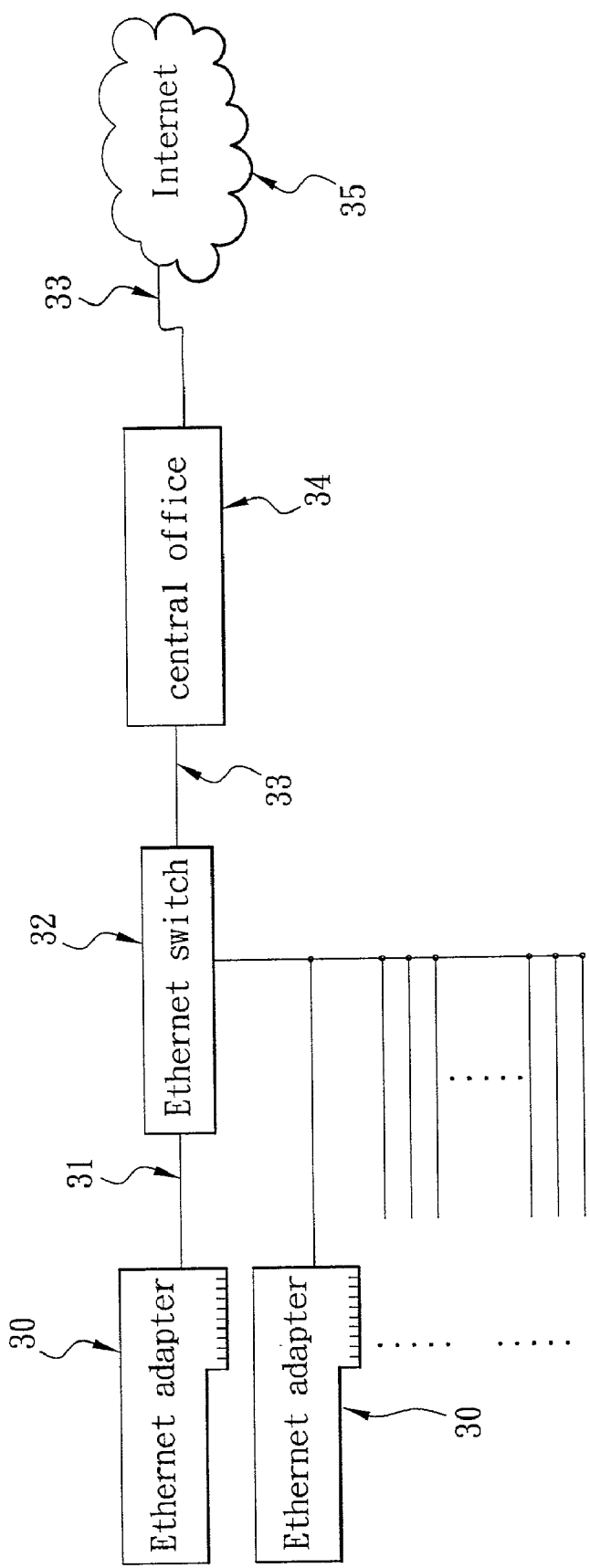
FIG. 1 presents schematically the connection of components of network architecture implemented in a conventional UTP based network architecture.
Figure 2:
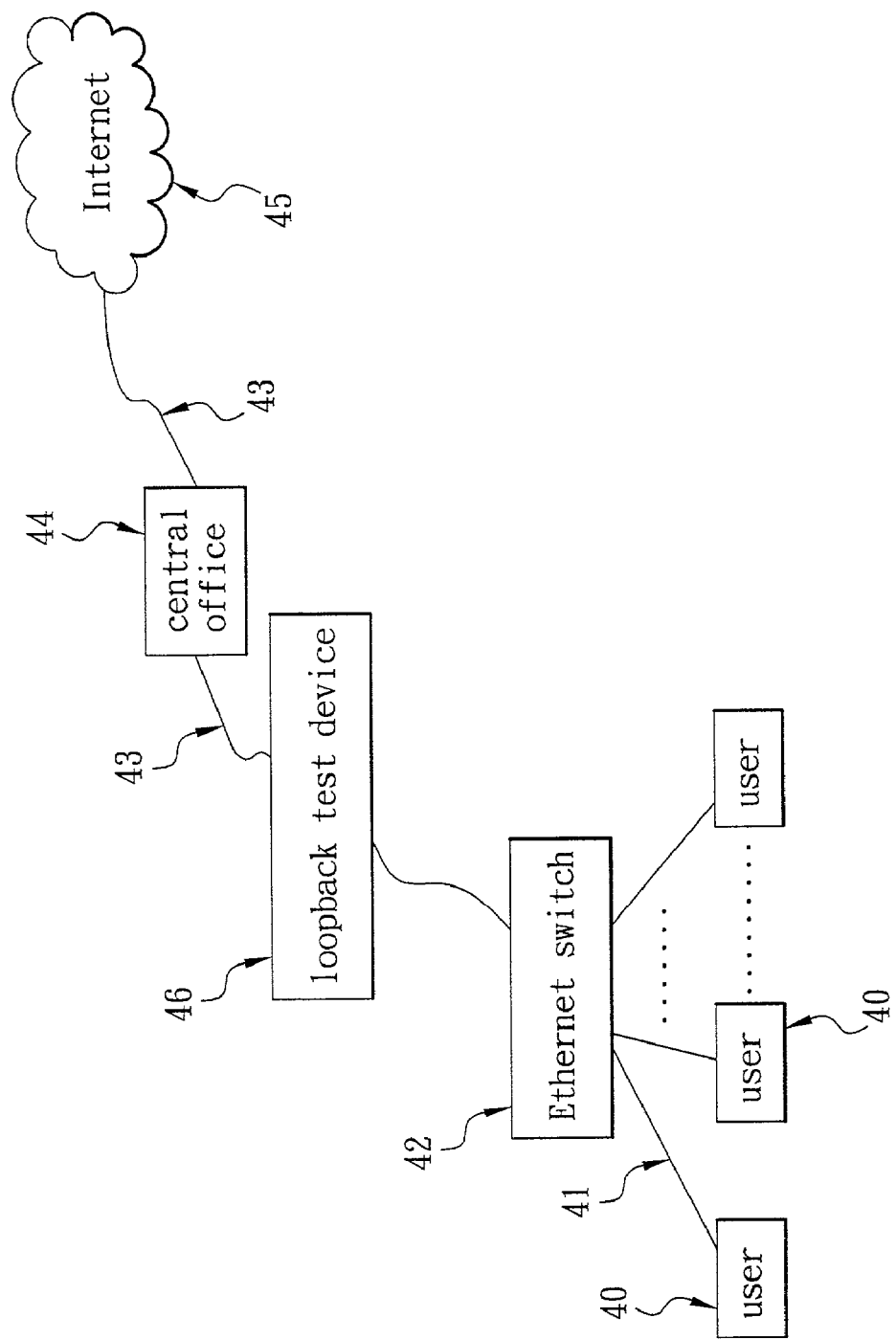
FIG. 2 presents schematically the connection of components of community network system according to the invention.
Figure 3:
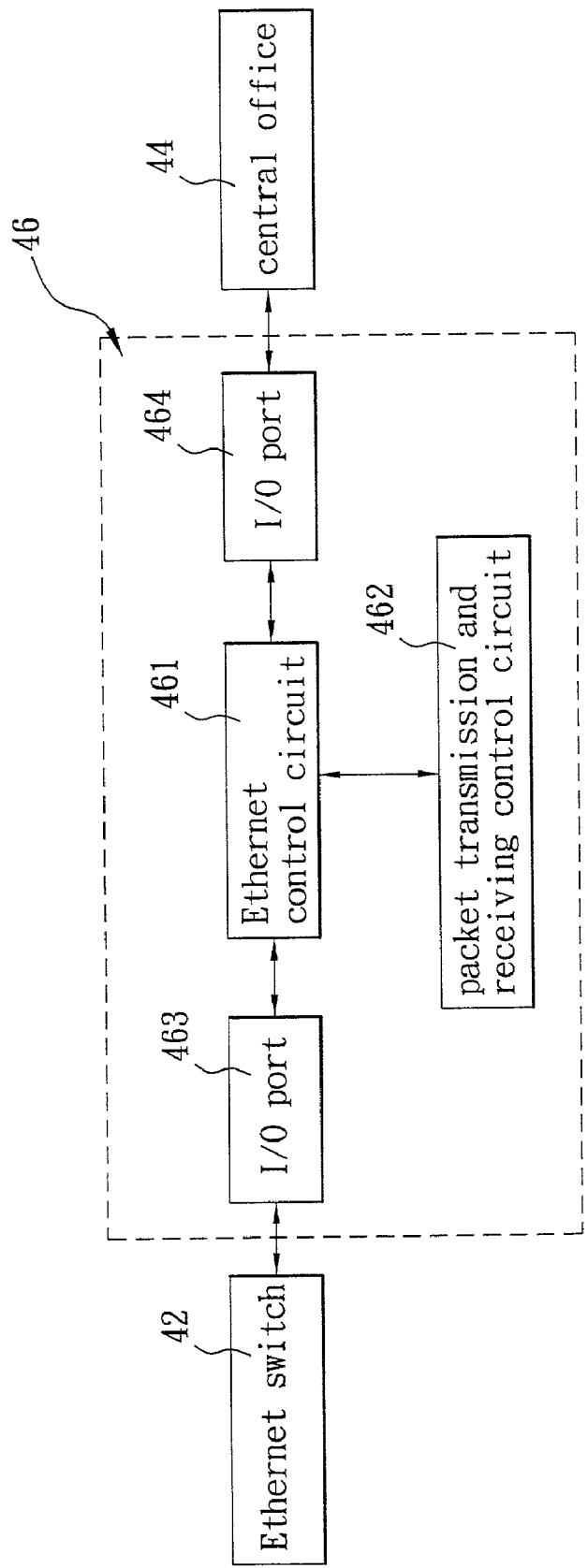
FIG. 3 is a block diagram of Ethernet switch, loopback test device, and central office of FIG. 2.
Figure 7:
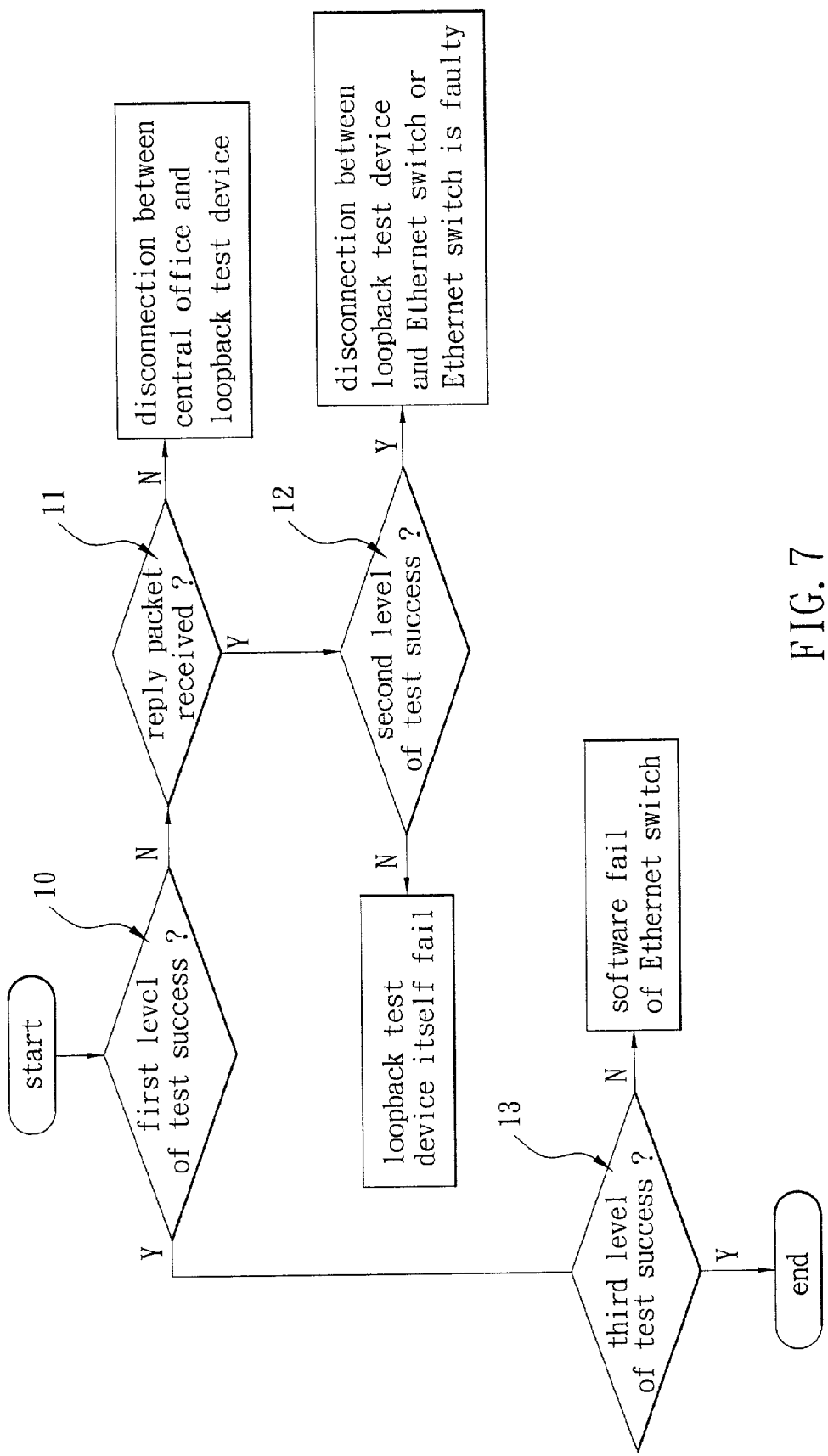
FIG. 7 is a flow chart illustrating network management system in central office how to utilize loopback test device to perform a loopback test on community network system according to a preferred embodiment of the invention.

Referring to FIG. 2, there is shown a typical UTP based network architecture. As shown, each user 40 is coupled to an Ethernet switch 42 through an existing telephone line 41. Ethernet switch 42 is coupled to central office 44 and the Internet 45 sequentially through optical fiber 43. Hence, packets from users 40 can be transmitted to the Internet 45. Alternatively, packets from the Internet 35 can be received by users 40. The invention installs a loopback test device 46 between Ethernet switch 42 in a community and central office 44. Referring to FIG. 3, loopback test device 46 comprises an Ethernet control circuit 461, a packet transmission and receiving control circuit 462, and at least two I/O ports 463 and 464. Ethernet control circuit 461 is implemented as an FPGA (Field Programmable Gate Array) or ASIC (Application Specific Integrated Circuit). Ethernet control circuit 461 acts to perform loopback test, packet generation, and packet reply. Packet transmission and receiving control circuit 462 is coupled to Ethernet control circuit 461. I/O port 463 is coupled between Ethernet switch 42 and Ethernet control circuit 461, while I/O port 464 is coupled between central office 44 and Ethernet control circuit 461. Therefore, it provides a mechanism needed for I/O ports 463 and 464 to be operated normally and for a variety of inter conversion or buffer to be operated in a full or half duplex mode.

In the invention, central office 44 utilizes loopback test device 46 to conduct a loopback test on community network system in which the loopback test comprises three levels. First level of loopback test acts to determine whether there is a hardware fail between network management system in central office 44 and loopback test device 46, and between network management system in central office 44 and Ethernet switch 42. In detail, network management system issues at least one special BPDU packet each having a format as shown in FIG. 4. When Ethernet control circuit 461 of loopback test device 46 receives at least one special BPDU packet, Ethernet control circuit 461 will operate to send the same to packet transmission and receiving control circuit 462. In response, packet transmission and receiving control circuit 462 changes a source address of BPDU packet into a special source address which is in turn sent back to network management system in central office 44 via Ethernet control circuit 461. The invention fills the reply packet with status information of I/O port 463 coupled to Ethernet switch 42. The status information comprises speed of I/O port 463, full or half duplex, and link status. Hence, network management system in central office 44 can determine whether the line is faulty or not after reply packet has been received. For example, the line is faulty if there is no reply after a predetermined period of time has lapsed. Further, network management system in central office 44 can determine whether I/O port 463 is normally coupled to Ethernet switch 42 in community. The complete format of reply packet is shown in FIG. 5.

Second level of loopback test of the invention acts to determine whether there is a fail between loopback test device 46 and Ethernet switch 42 in community. In detail, network management system issues at least one special BPDU packet each having a format as shown in FIG. 6. When Ethernet control circuit 461 of loopback test device 46 receives a special BPDU packet for enabling a loopback test mode, packet transmission and receiving control circuit 462 will command Ethernet control circuit 461 to enable I/O port 463 coupled to the Ethernet switch 42 in the community enter into the loopback test mode. Hence, all packets sent to I/O port 463 from network management system in central office 44 are sent back to network management system in central office 44 without having any change, resulting in a completion of loopback test. After the completion of loopback test, network management system in central office 44 will issue one (or more) special BPDU packet to finish the loopback test mode. When Ethernet control circuit 461 of loopback test device 46 receives the special BPDU packet, packet transmission and receiving control circuit 462 will command Ethernet control circuit 461 to enable I/O port 463 coupled to the Ethernet switch 42 in the community enter into a normal mode.

Third level of loopback test of the invention acts to utilize a well known Ping instruction to determine whether there is a hardware and/or software fail between network management system in central office 44 and Ethernet switch 42 in community. The test procedure is well known. Thus a detailed description thereof is omitted herein for the sake of brevity.

Referring to FIG. 3, there is shown a flow chart illustrating network management system in central office 44 how to utilize loopback test device 46 to perform a loopback test on community network system according to a preferred embodiment of the invention. There are three levels of loopback test involved in the community network system as detailed below.

In first level of loopback test (step 10), network management system issues at least one special BPDU packet. Then it is determined whether a reply packet has been received from loopback test device 46 within a predetermined period of time. If yes, then it is determined whether information contained in the reply packet shows that I/O port 463 is normally coupled to Ethernet switch 42 in community. If yes, it means that first level of loopback test is a success, process goes to step 13. Otherwise, process goes to step 11.

In step 11, it is determined whether a reply packet has been received. If yes and process further determines that I/O port 463 is not normally coupled to Ethernet switch 42 in community, process goes to step 12. Otherwise, if there is no reply packet from loopback test device 46 within a predetermined period of time, it means that there is a disconnection between network management system in central office 44 and loopback test device 46.

In step 12, second level of loopback test is performed in which network management system in central office 44 issues at least one special BPDU packet. Then it is determined whether all packets sent to I/O port 463 from network management system in central office 44 are sent back to network management system in central office 44 without having any change. If yes, it means that there is a disconnection between loopback test device 46 and Ethernet switch 42 in community or the Ethernet switch 42 in the community is faulty. Otherwise, if not all packets sent to I/O port 463 from network management system in central office 44 are sent back to network management system in central office 44, it means that loopback test device 46 itself is faulty.

In step 13, third level of loopback test is performed in which network management system in central office 44 issues at least one Ping instruction and then further determine whether there is a reply from Ethernet switch 42 in community (which has already received the Ping instruction) within a predetermined period of time. If yes, it means that community network system operates normally. Otherwise, it means that there is a software fail in Ethernet switch 42.

In view of above, network management system of the invention can easily obtain the following information of whether there is a fault between central office and loopback test device, whether the connection of Ethernet switch in community is good, and whether loopback test device operates normally. Hence, the invention has the advantages of no need to assign employees to the site of Ethernet switch to perform a manual maintenance and management, lower cost, and to improve communication quality.

While the invention has been described by means of special embodiments, numerous modifications and variations could be made thereto by those skilled in the art without departing from the scope and spirit of the invention set forth in the claims.

What is claimed is:

1. A method for a multi-level loopback test, wherein a loopback test device is installed between an Ethernet switch in a community and a community network system in a central office so that during the loopback test on the community network system in the central office, the loopback test device is operated by a network management system to perform the steps of:
    (a) in a first level of the loopback test, commanding the network management system to issue at least one special BPDU (Bridge Protocol Data Unit) packet, wherein it is determined whether a reply packet has been received from the loopback test device within a predetermined period of time; if yes and it is determined whether information contained in the reply packet shows that an I/O port of the loopback test device is normally coupled to an Ethernet switch in the community, and if the reply packet has not been received from the loopback test device within the predetermined period of time, it means that there is a disconnection between the network management system in the central office and the loopback test device; and
    (b) in a second level of the loopback test, the network management system in the central office issuing at least one special BPDU packet, wherein it is determined whether all of the packets sent to the I/O port from the network management system in the central office are sent back to the network management system in the central office without having any change; if yes, it means that there is a disconnection between the loopback test device and the Ethernet switch in the community or the Ethernet switch in the community is faulty, and otherwise if not all of the packets sent to the I/O port from the network management system in the central office are sent back to the network management system in the central office, it means that the loopback test device is faulty.

2. The method of claim 1, wherein in step (a) of the first level of the loopback test when the network management system has received the reply packet from the loopback test device within the predetermined period of time, in response it is determined whether information contained in the reply packet shows that the I/O port is normally coupled to the Ethernet switch in the community, if yes, it means that the first level of the loopback test is a success, and in response a third level of the loopback test is performed, wherein the network management system in the central office issues at least one Ping instruction and determines whether there is a reply from the Ethernet switch in the community within the predetermined period of time; if yes, it means that the community network system operates normally, and otherwise, it means that there is a software fail in the Ethernet switch.

3. The method of claim 1, wherein in step (a) of the first level of the loopback test it is determined whether there is a hardware fail between the network management system in the central office and the loopback test device or between the network management system in the central office and the Ethernet switch wherein the network management system issues at least one special BPDU packet, when an Ethernet control circuit of the loopback test device receives at least one special BPDU packet, the Ethernet control circuit will send the same to a packet transmission and receiving control circuit, and in response the packet transmission and receiving control circuit changes a source address of the BPDU packet into a specific source address which is in turn sent back to the network management system in the central office via the Ethernet control circuit.

4. The method of claim 1, wherein in step (a) of the first level of the loopback test the reply packet is filled with status information of the I/O port coupled to the Ethernet switch so that the network management system in the central office is capable of determining whether a communication line is faulty or not after the reply packet has been received and determining whether the I/O port is normally coupled to the Ethernet switch in the community.

5. The method of claim 1, wherein in step (b) of the second level of the loopback test it is determined whether there is a fail between the loopback test device and the Ethernet switch in the community wherein the network management system issues at least one special BPDU packet, and wherein when the Ethernet control circuit of the loopback test device receives a special BPDU packet for enabling a loopback test mode, the packet transmission and receiving control circuit will command the Ethernet control circuit to enable the I/O port coupled to the Ethernet switch in the community to enter into the loopback test mode so that all of the packets sent to the I/O port from the network management system in the central office are sent back to the network management system in the central office without any change, resulting in a completion of the loopback test.

6. The method of claim 5, wherein after the completion of the loopback test, the network management system in the central office will issue at least one special BPDU packet for finishing the loopback test mode, wherein when the Ethernet control circuit of the loopback test device receives the special BPDU packet, the packet transmission and receiving control circuit of the loopback test device will command the Ethernet control circuit to enable the I/O port coupled to the Ethernet switch in the community to enter into a normal mode.

7. An apparatus for a multi-level loopback test installed between an Ethernet switch in a community and a community network system in a central office, the apparatus comprising:
    at least two I/O ports;
    an Ethernet control circuit having one end coupled to the Ethernet switch in the community via one I/O port and the other end coupled to the central office via the other I/O port so that the Ethernet control circuit is operative to cause the I/O ports to operate normally and control a conversion or buffer in a full or half duplex mode; and
    a packet transmission and receiving control circuit formed of an integrated circuit for performing a loopback test, a packet generation, and a packet reply, the packet transmission and receiving control circuit being coupled to the Ethernet control circuit;

wherein a network management system in the central office performs the loopback test on the community network system, and wherein when the Ethernet control circuit receives at least one special BPDU packet sent from the network management system, the Ethernet control circuit will send the same to the packet transmission and receiving control circuit, and in response, the packet transmission and receiving control circuit changes a source address of the BPDU packet into a specific source address which is in turn sent back to the network management system in the central office via the Ethernet control circuit so that the network management system in the central office is capable of determining whether a communication line is faulty or not and determining whether the I/O port is normally coupled to the Ethernet switch in the community.

8. The apparatus of claim 7, wherein after the Ethernet control circuit has received a special BPDU packet from the network management system for enabling a loopback test mode, the packet transmission and receiving control circuit will command the Ethernet control circuit to force the I/O port coupled to the Ethernet switch in the community into the loopback test mode so that all of the packets sent to the I/O port from the network management system in the central office are sent back to the network management system in the central office without having any change, resulting in a completion of the loopback test.

9. The apparatus of claim 8, wherein after the completion of the loopback test when the Ethernet control circuit receives a special BPDU packet issued from the network management system for finishing the loopback test mode, the packet transmission and receiving control circuit will command the Ethernet control circuit to enable the I/O port coupled to the Ethernet switch in the community to enter into a normal mode.

* * * * *